P. G. TACCHI.
VEHICLE SPRING.
APPLICATION FILED DEC. 10, 1921.
1,433,246.
Patented Oct. 24, 1922.
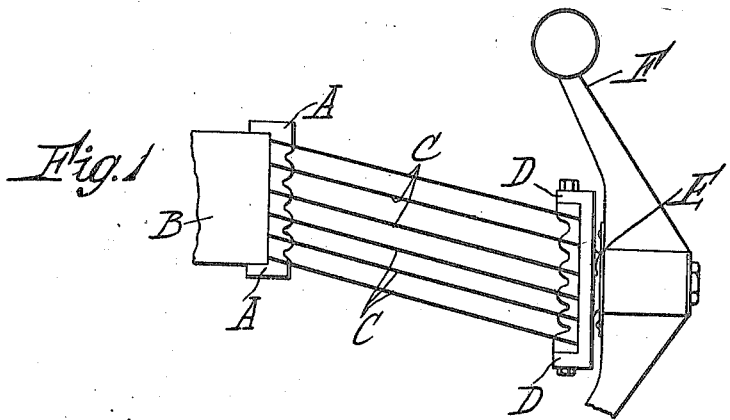
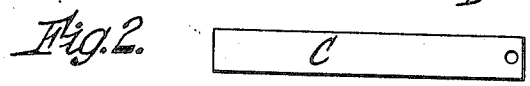
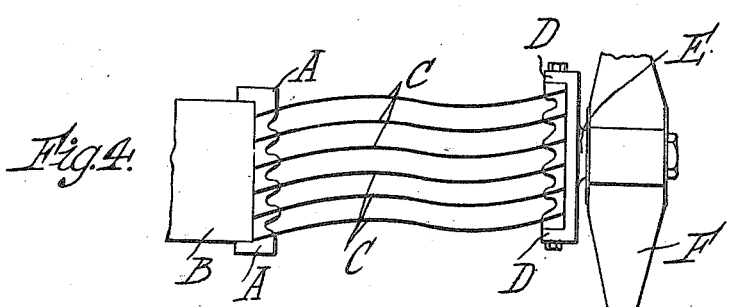
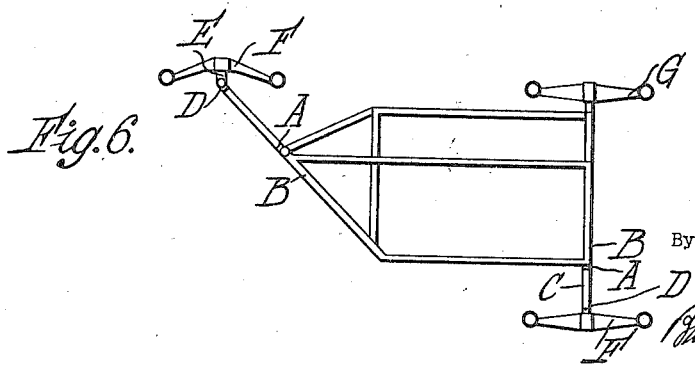
Inventor:
P. G. Tacchi,
By his Attorneys, Patented Oct. 24, 1922.

1,433,246

UNITED STATES PATENT OFFICE.

PERCY GEORGE TACCHI, OF LONDON, ENGLAND, ASSIGNOR TO T. A. C. LIMITED, OF HANWELL, ENGLAND.

VEHICLE SPRING.

Application filed December 10, 1921. Serial No. 521,527.

*To all whom it may concern:*

Be it known that I, PERCY GEORGE TACCHI, a subject of the King of Great Britain, residing at 29 Nemoure Road, Acton, London, W. 3, England, have invented new and useful Improvements in Vehicle Springs, of which the following is a specification.

The object of this invention is to provide an improved means for connecting the wheel of an automobile to the frame.

My invention is illustrated by the accompanying drawing. Figure 1 is a part sectional elevation showing a wheel connected to the frame of an automobile, Figure 2 is a plan of one of the springs, Figure 3 is an edge view of one of the springs in its bent condition, Figures 4 and 5 are views similar to Figures 1 and 3 showing a modification, and Figure 6 is a diagrammatic plan of the frame of a motor tricycle.

In Figure 1, A is a fitting secured to a part B of the frame of an automobile, C, C, are flat blade springs having their inner ends secured to the fitting A, while their outer ends are secured to a fitting D similar to A and carrying the axle E of a wheel F. It will be seen that with this construction when the frame B descends through a small distance with respect to the axle E each spring undergoes a double bending as illustrated in Figure 3 with the result that the fitting A can descend vertically without an alteration of the horizontal distance between the parts A and D owing to the fact that each spring is as it were shortened owing to the bends in it. This form of construction is suitable when the inner end of each spring is naturally at a higher level than its outer end. When, however, the inner end of each spring is naturally at a lower level than its outer end the springs are in their natural condition bent as shown in Figure 4, and when the fitting A descends with respect to the fitting D each spring straightens out as shown in Figure 5; thus again it is possible for fitting A to move downwards with respect to fitting D without the horizontal distance between them being affected.

Figure 6 shows diagrammatically the frame of a tricycle in which two of the wheels F, F, are connected as above described by springs to the frame while the third wheel G is unsprung.

What I claim is:—

1. The combination with a vehicle frame and a wheel axle, of a series of transverse, normally inclined blade springs rigidly connected at their ends directly to the frame and axle and adapted to flex upon relative movement between said parts without varying the horizontal distance therebetween.

2. The combination with a vehicle frame and a wheel axle, of a series of transverse, normally inclined blade springs firmly connected at their ends to the frame and axle and adapted to change their shape upon relative vertical movement between said parts without varying the distance between their ends measured in a horizontal plane.

In testimony that I claim the foregoing as my invention I have signed my name this 28th day of November 1921.

PERCY GEORGE TACCHI.